United States Patent
Geva et al.

(10) Patent No.: US 7,607,078 B2
(45) Date of Patent: Oct. 20, 2009

(54) PAPER AND ELECTRONIC RECOGNIZABLE FORMS

(75) Inventors: Amir Geva, Yokne'am Ilit (IL); Ehud Karnin, Koranit (IL); Eugeniusz Walach, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 828 days.

(21) Appl. No.: 11/176,503

(22) Filed: Jul. 6, 2005

(65) Prior Publication Data
US 2007/0009158 A1    Jan. 11, 2007

(51) Int. Cl.
*G06F 17/00* (2006.01)

(52) U.S. Cl. .................. 715/221; 715/222; 715/224; 715/226

(58) Field of Classification Search .............. 715/200, 715/221, 222, 224, 226
See application file for complete search history.

(56) References Cited

U.S. PATENT DOCUMENTS

| | | | |
|---|---|---|---|
| 4,809,220 A | | 2/1989 | Carlson et al. |
| 5,317,646 A | * | 5/1994 | Sang et al. ................. 382/175 |
| 5,619,635 A | | 4/1997 | Millman et al. |
| 5,889,932 A | | 3/1999 | Adegeest et al. |
| 6,522,770 B1 | | 2/2003 | Seder et al. |
| 6,600,482 B1 | | 7/2003 | Leone, Jr. et al. |
| 6,816,630 B1 | | 11/2004 | Werth et al. |
| 2001/0052108 A1 | * | 12/2001 | Bowman-Amuah ............ 717/1 |
| 2002/0010679 A1 | * | 1/2002 | Felsher ....................... 705/51 |
| 2002/0029194 A1 | * | 3/2002 | Lewis et al. .................. 705/39 |
| 2002/0048369 A1 | * | 4/2002 | Ginter et al. ................ 380/277 |
| 2002/0050982 A1 | | 5/2002 | Ericson |
| 2002/0077785 A1 | * | 6/2002 | Buote et al. ................. 702/188 |
| 2002/0120582 A1 | * | 8/2002 | Elston et al. .................. 705/64 |
| 2002/0178079 A1 | * | 11/2002 | Russell et al. ................. 705/26 |
| 2002/0194035 A1 | * | 12/2002 | DiRienzo ....................... 705/4 |
| 2003/0040128 A1 | * | 2/2003 | Meador et al. .............. 436/518 |
| 2003/0188260 A1 | | 10/2003 | Jensen et al. |
| 2004/0237040 A1 | * | 11/2004 | Malkin et al. ............... 715/526 |

FOREIGN PATENT DOCUMENTS

| | | |
|---|---|---|
| EP | 0451485 | 10/1991 |
| JP | 2004005519 A2 | 1/2004 |

* cited by examiner

*Primary Examiner*—Stephen S Hong
*Assistant Examiner*—Gregory J Vaughn

(57) ABSTRACT

A method for processing forms in a computer system includes receiving from a human operator a design of a unified from template including data fields and respective attributes. Paper forms and electronic forms (e-forms) are automatically produced based on the unified form template. Filled-in paper forms and filled-in e-forms are accepted from the clients of the computer system, the filled-in forms including data items filled into the respective data fields by the clients. The data items are extracted from the filled-in paper forms and the filled-in e-forms responsively to the unified form template.

17 Claims, 3 Drawing Sheets

PAPER AND ELECTRONIC RECOGNIZABLE FORMS

FIELD OF THE INVENTION

The present invention relates generally to form processing systems, and particularly to methods and systems for jointly designing and processing paper and electronic forms.

BACKGROUND OF THE INVENTION

Many types of organizations use forms to acquire data from clients, so as to provide services and run their business. Such organizations typically run computerized databases and other computerized systems for storing and otherwise processing the information conveyed in the forms. Typically, such systems process large numbers of forms and convert them into computer-readable information.

Some applications use paper forms that are filled in and submitted by clients. For example, IBM Corp. (Armonk, N.Y.) produces an Intelligent Forms Processing (IFP) system, which automates data capture from large numbers of paper forms. Additional details regarding the IFP system are available at www2.clearlake.ibm.com/GOV/ifp/.

Other applications use electronic forms (e-forms), which are filled in electronically by the client. For example, Adobe Systems Inc. (San Jose, Calif.) produces an architecture for processing e-forms called Adobe XML. Additional information regarding this product is available at www.adobe.com/enterprise/xml.html.

Several methods and systems for designing and processing forms are known in the art. For example, European Patent EP0451485 describes a form authoring toolkit for on-screen form design using an interactive display. The user interface allows non-programmers to design and process electronic and paper forms.

U.S. Pat. No. 6,600,482 describes a system for automated identification of pre-printed forms, based on the location of a mark made manually on the form. The system identifies the existence and location of the mark and identifies the pre-printed form based on this location.

U.S. Pat. No. 6,816,630 describes a system for creating and processing data forms using conventional word processing and database computer programs. The system can extract data from completed forms. The extracted data can then be stored in a commercially available database for processing.

U.S. Pat. No. 5,619,635 describes a form preparation system. The system integrates a graphics based form generator with embedded, form-specific logic and provides as output a form specification report. The system operates in an interactive manner allowing the user to review modifications to the form as it develops. Upon completion, the form includes specifications required to control a high speed printing operation.

U.S. Pat. No. 5,317,646 describes a form recognition system which assists an operator in creating an electronic template. The method allows an operator to view an electronic bitmap of a master or blank form on a graphical display. The operator selects a point within a region of the bitmap with a pointing device, and the coordinates representing the region are automatically determined.

U.S. Patent Application Publication 2003/0188260 A1 describes a data processing system for designing, creating, and importing data into a viewable form. Japanese Patent Publication JP 2004005519A2 describes another system for designing form layout.

SUMMARY OF THE INVENTION

There is therefore provided, in accordance with an embodiment of the present invention, a method for processing forms in a computer system, including receiving from a human operator a design of a unified form template including data fields and respective attributes. Paper forms and electronic forms (e-forms) are produced automatically based on the unified form template. Filled-in paper forms and filled-in e-forms are then accepted from clients of the computer system, the filled-in forms including data items filled into the respective data fields by the clients. The data items are extracted from the filled-in paper forms and the filled-in e-forms responsively to the unified form template. A computerized system and a computer software product for processing forms for processing forms are also provided.

There is additionally provided, in accordance with an embodiment of the present invention, apparatus for designing forms, including a user interface, which is arranged to interact with a human operator so as to receive a design of a unified form template including data fields and respective attributes. A form processor is arranged to automatically produce paper forms and electronic forms (e-forms) based on the unified form template, so as to enable a computerized form processing system to accept filled-in paper forms and filled-in e-forms from clients, the filled-in forms including data items filled by the clients into the respective data fields, and to extract the data items from the filled-in paper forms and the filled-in e-forms responsively to the unified form template.

The present invention will be more fully understood from the following detailed description of the embodiments thereof, taken together with the drawings in which:

DETAILED DESCRIPTION OF EMBODIMENTS

Overview

Figure 1:
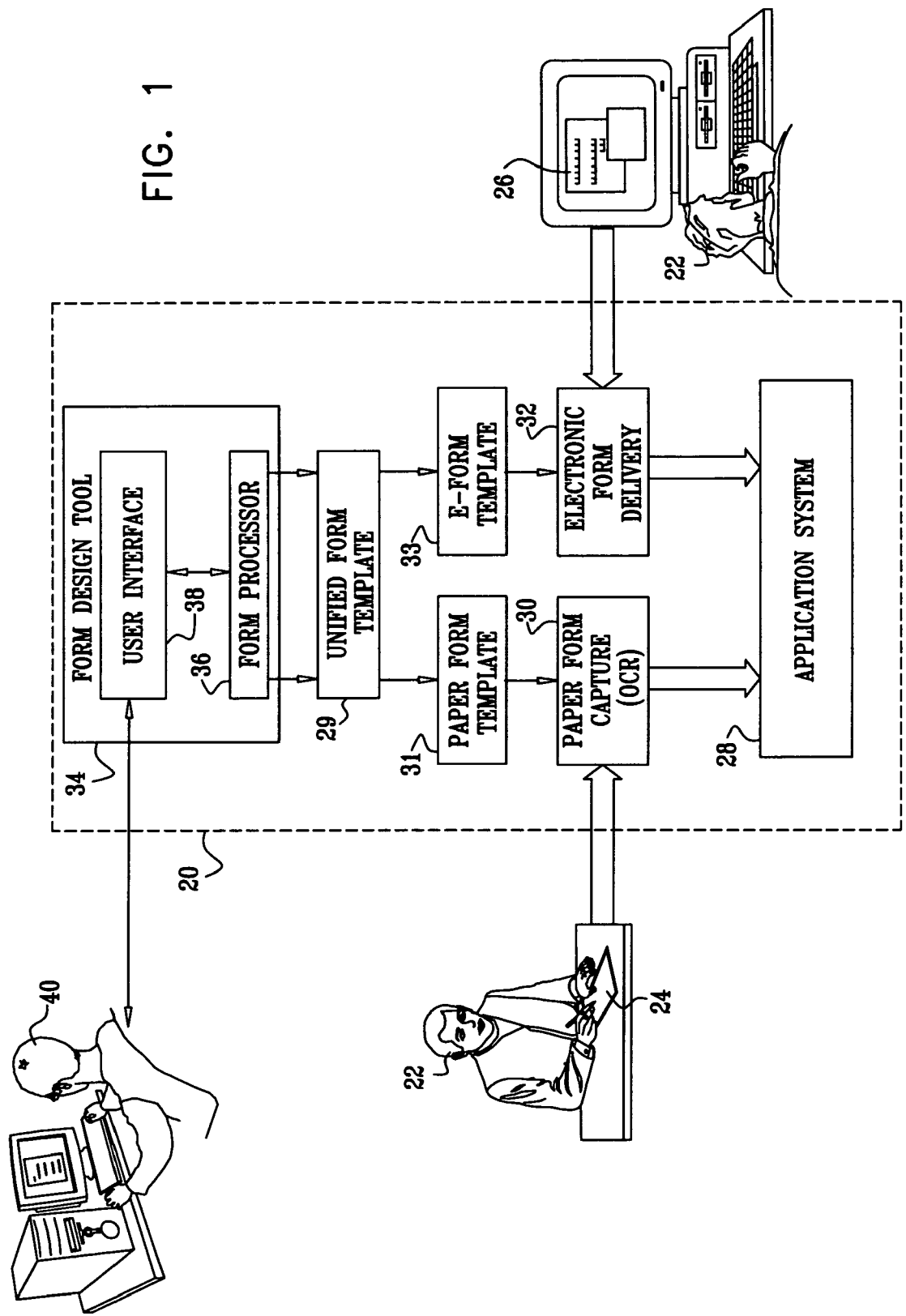
FIG. 1 is a block diagram that schematically illustrates a computer system that involves form processing, in accordance with an embodiment of the present invention.

In many applications, it is desired for a form processing computer system to accept and process both paper forms and electronic forms (e-forms). Although e-forms are easier to process and typically reduce the operating costs of the system, many clients prefer to use paper forms. Clients may prefer paper forms over e-forms for convenience, from habit or tradition, for lack of computer literacy or because they lack access to a computer.

In many cases paper forms and e-forms can be viewed as different data entry methods that are used to provide the same information. Nevertheless, in conventional form processing systems there is typically no inherent correlation or synchronization between paper forms and e-forms. In these systems, paper forms and e-forms typically undergo separate design processes. Designing an e-form on the basis of an existing paper form, and vice versa, is typically a tedious, time consuming and error-prone manual process. When such forms are filled in and submitted by clients, the data capturing and validation processes are also typically separate for paper and electronic forms. The separation between paper forms and e-forms, throughout the form's life cycle, causes unnecessary spending of resources, reduces the system performance and complicates the task of maintaining configuration control.

In view of these shortcomings of conventional form processing systems, embodiments of the present invention provide methods and systems that jointly design, maintain and process paper forms and e-forms. In some embodiments, a human operator, typically a form designer, performs a single design process that produces a unified form template. The unified template forms the basis for both paper forms and e-forms, comprising all visual and layout-related aspects and all logical, content-related aspects of the form design. After designing and producing the unified form template, paper forms and e-forms can be produced automatically by the system without further input from the designer.

The design process is typically performed using a form design tool and a user interface, which are described in detail hereinbelow.

In some embodiments, the unified template defines the various data fields of the form. For each data field, the template defines attributes that are relevant to the paper form, the e-form, or both. The unified template also defines validation rules, for validating the data items filled by clients in the data fields of the form. In some embodiments, separate paper form templates and e-form templates are derived from the unified template.

In some embodiments, the attributes and validation rules of the unified form template are used to train and enhance the performance of an optical character recognition (OCR) process, used for data capturing of paper forms. Thus, the form processing system can begin to process newly-designed paper forms without the need for prior manual training.

In other embodiments, the validation rules and attributes are used to verify and validate the captured information of both paper forms and e-forms.

System Description

FIG. 1 is a block diagram that schematically illustrates a computer system 20 that involves form processing, in accordance with an embodiment of the present invention. System 20 may belong, for example, to a government office that collects personal information from individuals using forms. System 20 may alternatively comprise an electronic business (e-business) system that processes order forms from clients. Further alternatively, system 20 may comprise any other computerized system that collects information from clients using forms. (The term "client" is used throughout this patent application to denote any person who interacts with the system, regardless whether the nature of this interaction is commercial or non-commercial.)

Clients 22 of system 20 provide information to the system by filling in and submitting forms. Forms may comprise either paper forms filled in with writing or typing by the client, or electronic forms (e-forms) filled in electronically in a computer-readable format and submitted to the system. Although electronic forms are easier to process and typically reduce the operating costs of system 20, many clients prefer to use paper forms. Some clients prefer paper forms for convenience, for habit or tradition, for lack of computer literacy or because they have no access to a computer when they need to submit the form. Additionally, in some applications it is required to provide a recognizable signature of the client as part of the form. Thus, in many applications it is desirable for system 20 to accept both paper forms and electronic forms.

Some of clients 22 fill in and submit paper forms 24 to system 20. Paper form 24 comprises one or more data fields, arranged in a particular layout, for entering respective data items. The paper form may be filled in by handwriting, typing or printing. The form may be submitted to system 20 by fax, by scanning the paper, by sending a scanned paper form using e-mail, or by using any other suitable delivery method. The information conveyed in the paper forms is captured and converted to a suitable computer-readable format by a paper form capture module 30. Module 30 thus serves as an input device for accepting paper forms. In some embodiments, module 30 uses various optical character recognition (OCR) methods known in the art for converting the alphanumeric information in the paper form to a suitable computer-readable format such as ASCII.

In conventional systems that process paper forms, the OCR system has to be manually "trained" to identify the information for each new type of form. Typically, the training process requires a human operator to identify to the OCR system the layout, contents and structure of each field in the paper form. This process is a tedious, time consuming and error-prone manual process. Embodiments of the present invention provide methods and tools for providing the necessary information to the OCR system of module 30 automatically, without any manual training or other human involvement. This process will be described in detail below.

For each type of paper form, a paper form template 31 is produced. Template 31 defines the various data fields of the form to the OCR process in module 30. The data field definitions comprise attributes relating to the visual or layout-related aspects, and to the logical content of the fields. For example, layout-related attributes may comprise the position coordinates of the field in the paper form and the size of the field. Content related attributes may comprise the expected character set in the field (e.g., numeric, alphanumeric or a character set comprising specific symbols).

The data field definitions in paper form template 31 may also comprise validation rules for validating the information provided in the field. Using the validation rules, the recognition accuracy of the OCR system in module 30 can be improved. The OCR system can also use the validation rules to identify potential recognition errors. For example, a validation rule for a zip code field may require that the field contain exactly five numerical digits. For a social security number field, the validation rules may also comprise a checksum verification formula, if such checksum is used in the numbering convention. In general, some attributes and/or validation rules may also apply to more than one data field, or to the entire form.

In many cases, the layout of the paper form may be designed in advance in a way that will assist the OCR process in module 30 and improve its recognition performance. "OCR-friendly" methods for designing paper forms, as are known in the art, may be applied at this stage. For example, numerical fields (e.g., zip code or social security number fields) may comprise separated and well-marked sub-fields for each digit. Field boundaries, separators and guidelines may be printed in a different color that is suppressed by the scanner or fax that delivers the form.

Other clients 22 of system 20 may fill in and submit e-forms 26. Similarly to the paper form, the e-form comprises one or more data fields for entering respective data items by the client. In some embodiments, the e-form is filled in using a client terminal or computer and suitable client software or a standard editor. The information filled into the e-form is represented in a suitable computer-readable format and is delivered to an e-form delivery module 32 in system 20. Module 32 serves as an input device for accepting e-forms into system 20 and may comprise any suitable delivery means. In some embodiments, the user terminal or computer is connected to system 20 using a permanent or temporary network connection, such as an Internet connection. The form may be also delivered using e-mail or by physical submission of computer-readable media. Alternatively, the e-form may be filled in and submitted using any other suitable means.

Each type of e-form is defined in terms of an e-form template 33, which specifies the various data fields of the e-form. The data field definitions in the e-form template may comprise attributes and/or validation rules, as described above in the description of the paper form template. In conventional e-form processing systems, the e-form template is typically produced by a human operator, in a manual process, on the basis of an existing paper form. Embodiments of the present invention produce the e-form template automatically, as part of the form design process. This process will be described in detail below.

Module 30 extracts the data items from paper forms 24 and validates them using paper form template 31. Similarly, module 32 extracts the data items from e-forms 26 and validates them using e-form template 33. The data items are then provided to an application system 28. The application system can store the data items in a database, provide various services to clients based on the information provided, or otherwise process the data items as required by the particular functionality of system 20.

In some embodiments, for each type of form, paper form 24 and e-form 26 are viewed by system 20 as two different data entry methods for providing the same information. Once the data items have been extracted from the form, using either module 30 or module 32, system 20 can no longer know whether these data items originated from a paper form of from an e-form. In many practical cases, many of the field definitions, attributes and validation rules are common to both paper form template and e-form template. In some alternative embodiments, certain differences may exist between the data fields of the paper form and the e-form, even though they are intended to collect similar information.

Thus, in contrast to conventional form processing methods, embodiments of the present invention make it possible to design and maintain the templates of the paper form and the e-form jointly, exploiting the commonalities between the two. The methods and tools described herein may be used to produce a unified form template 29 that jointly defines both e-forms and paper forms, comprising the layout-related attributes, the content-related attributes and the validation rules for each data field. Typically, many of the attributes and the validation rules are common to the definition of both paper forms and e-forms.

Figure 3:
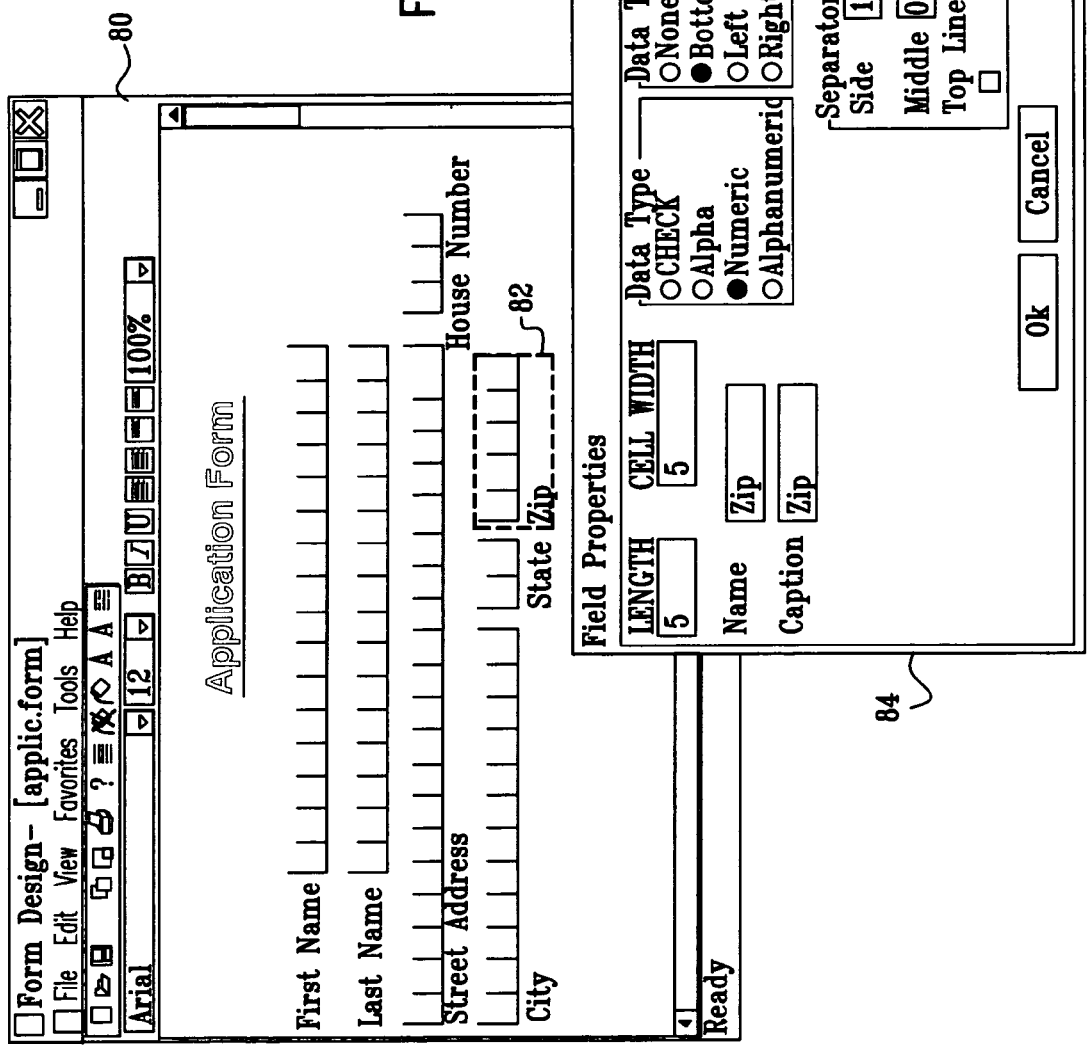
FIG. 3 is a diagram that schematically illustrates a user interface of a form design tool, in accordance with an embodiment of the present invention.

When it is desired to design a new type of form or to update an existing form, a form design tool 34 is used. The form design tool comprises a form processor 36 for performing the various design functions described below, and a user interface 38 for interacting with a designer 40. Interface 38 typically comprises a graphical user interface (GUI), such as a drag-and-drop interface. An exemplary user interface is shown in FIG. 3 below. The form design tool produces unified form template 29 and derives from it the corresponding paper form template 31 and e-form template 33. The latter two templates are then used for submitting, capturing and validating paper forms and e-forms. Once the unified form template is defined, paper forms and e-forms can be produced automatically by the system without further input from the designer.

Typically, form design tool 34 comprises a general-purpose computer, which is programmed in software to carry out the functions described herein. The software may be downloaded to the computer in electronic form, over a network, for example, or it may alternatively be supplied to the computer on tangible media, such as CD-ROM. Further alternatively, tool 34 may be implemented using a combination of hardware and software elements. The form design tool may be a standalone unit, or it may alternatively be integrated with other computing platforms of system 20.

Form Processing Method Description

Figure 2:
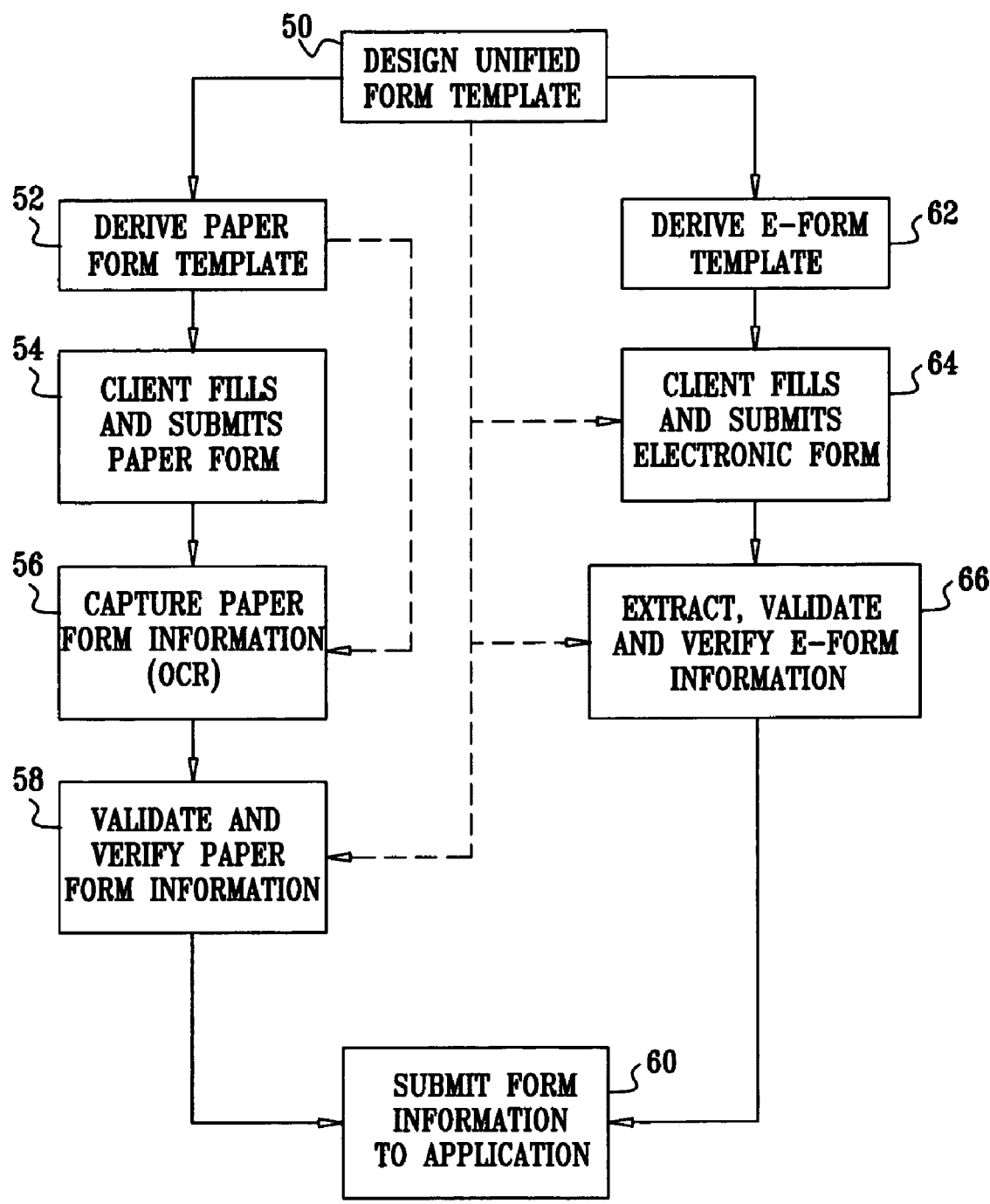
FIG. 2 is a flow chart that schematically illustrates a method for processing forms, in accordance with an embodiment of the present invention.

FIG. 2 is a flow chart that schematically illustrates a method for processing forms, in accordance with an embodiment of the present invention. The life cycle of a new form begins with designer 40 designing unified form template 29, at a template design step 50. In principle, the designer performs a single design process, using form design tool 34, which produces the unified form template. The unified template is then used as the basis for both paper forms and e-forms. The design process typically comprises a visual design and a content-related design.

In the visual design the designer determines, using user interface 38, the layout and graphical aspects of the form that will be used to produce paper form 24. The designer lays out the different data fields of the new form and determines the coordinates, size and other layout-related attributes of each data field. The designer also determines the graphical appearance of the form. As part of the visual design, graphical features that assist the OCR process, as described above, can be added. The visual design is represented in a suitable printable and viewable format. The layout-related attributes are stored in a suitable computer-readable format.

In some embodiments, the visual design phase can be implemented using a conventional form design tool. For example, Adobe Systems Inc. (San Jose, Calif.) produces a tool for visual form design called Adobe LiveCycle™ Designer. Additional information regarding this product can be found at http://www.adobe.com/products/server/adobedesigner/main.html.

In the content-related design, the designer enters the required attributes and/or validation rules for each data field, as applicable. These attributes will be used later for enhancing the data capture process of the paper forms and e-forms and for verifying and validating the data items extracted from the forms.

The result of step 50 is unified form template 29 comprising all the information pertaining to the newly-designed form. The sequence of steps 52-58 below describes the method steps relevant to the processing of paper forms based on template 29. The sequence of steps 62-66 below describes the method steps that are relevant to e-forms. The two sequences can be implemented in any order.

We shall first describe the method steps relevant to the processing of paper forms. Form processor 36 of tool 34 produces paper form template 31 based on unified template 29, at a paper template generation step 52. In some embodiments, the processor reduces template 29 to comprise only the visual design and the attributes and validation rules that are relevant to the processing of paper forms. In particular, validation rules that can be used to improve the OCR process (sometimes referred to as "training rules") are included in the paper form template. For this reason the paper form template is sometimes also referred to as a "training template." In other embodiments, the generation of a separate paper form template is omitted. In these embodiments, the OCR process and the data validation process use the relevant attributes and validation rules of the unified template directly. Based on the paper form template, blank paper forms can be printed and distributed to clients.

The method continues when a client fills in and submits a paper form, at a paper delivery step 54. The information conveyed by the paper form is captured at a paper capturing step 56. Module 30 captures the information, typically using an OCR process. In some embodiments, module 30 uses some of the attributes and validation rules of template 31 to improve the performance of the OCR process. For example, the OCR process can verify whether the characters recognized in a certain data field match the expected character set, as defined by the attributes of this field. The OCR process can also look for certain data-fields only within a specified coordinate range, as defined in the attributes. As noted above, the OCR uses the information in template 31 directly, without the need for manual training of any kind.

Having captured the form information, module 30 reconstructs the different data items in the paper form, verifies and validates the data items, at a paper validation step 58. Typically, module 30 uses the attributes and validation rules defined in template 31 in order to verify and validate the data items. For example, consider an application in which the client fills in his street address as part of the paper form. The client's street name and zip code have already been extracted from the form using the OCR process at paper capturing step 56 above. Validating the street address may comprise querying a postal database, so as to verify that the street name is indeed a valid street name that belongs to the area of the extracted zip code.

If errors are found in the validation process, system 20 can take certain error handling measures. The particular error handling measures are considered to be outside the scope of this patent application. In general, erroneous data items may be discarded or marked as erroneous, application system 28 may be notified when errors are found, etc. In some cases, the client may be asked to resubmit the form. After verifying and validating the data items, the data is provided to application system 28, at a data submission step 60.

We shall now describe the method steps relevant to the processing of e-forms. Form processor 36 of tool 34 produces e-form template 33 based on unified template 29, at an e-form template generation step 62. In some embodiments, the processor reduces template 29 to comprise only the attributes and validation rules that are relevant to the processing of e-forms. In particular, the visual and graphical design is typically not part of the e-form template. In other embodiments, the generation of a separate e-form template is omitted, and the data validation process uses the attributes and validation rules of the unified template directly. The e-form template can be represented in a suitable computer-readable format and distributed to clients.

The method continues when a client fills in and submits an e-form, at an electronic delivery step 64. The client typically uses template 33 to enter the different data items in the respective data fields of the e-form. In some embodiments, some of the validation rules of template 33 can be used to validate the data items entered by the client before they are delivered to system 20. For example, if the client uses suitable client software or a dedicated client terminal for filling in the e-form, then some of the validation rules can be distributed to the software or terminal to validate the entered information. In other embodiments the data validation is deferred to later stages, after the e-form is submitted to the system.

Module 32 accepts and validates the submitted e-form, at an e-form validation step 66. Module 32 extracts the data items from the respective data fields of the form, and then validates and verifies the data items using the attributes and validation rules of template 33.

In some embodiments, the data validation process comprises database lookup operations. For example, consider a data field that is classified in the unified template as a last name field. In the data validation process (at either step 58 or step 66 above), the system can query a database of valid last names with the extracted data item, in order to validate the name extracted from the form.

Having extracted and validated the data items, the data is provided to application system 28 at data submission step 60.

FIG. 3 is a diagram that schematically illustrates part of user interface 38 of form design tool 34, in accordance with an embodiment of the present invention. The figure is derived from an exemplary screenshot of tool 34, as implemented by the inventors. A window 80 shows part of an application form being designed. The window shows parts of the visual design, such as the heading and a layout of several data fields. The data fields are marked with separators that define the expected position of each character.

In the present example, a zip code data field 82 is currently being defined or edited. A window 84 shows the attributes of the zip code data field. For example, the zip code is specified as having 5 numeric characters with predefined size and separation.

Although the methods and systems described herein mainly address the joint design and processing of paper forms and e-forms, the principles of the present invention can also be used for other applications. It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method for processing forms in a computer system, comprising:

receiving from a human operator a unified form template specifying a joint design of a paper form and an electronic form (e-form), wherein the unified template comprises data fields and respective attributes, of which a common attribute is specified jointly for a given data field in both the paper form and the e-form;

automatically producing, based on the unified form template, paper forms to be filled in by hand by first clients of the computer system and e-forms to be filled in electronically by second clients of the computer system;

accepting filled-in paper forms, in which first data items have been filled in by hand into the given data field by the first clients, and filled-in e-forms, in which second data items have been filled in electronically into the given data field by the second clients;

extracting the first and second data items respectively from the filled-in paper forms and the filled-in e-forms; and validating, using the common attribute, both the first data items that were extracted from the filled-in paper forms and the second data items that were extracted from the filled-in e-forms.

2. The method according to claim 1, wherein the unified form template comprises a common validation rule that defines a validity criterion for the first and second data items filled in into the given data field, and wherein validating the first and second data items comprises validating the first and second data items responsively to the common validation rule.

3. The method according to claim 2, wherein extracting the first data items from the filled-in paper forms comprises applying an optical character recognition (OCR) process to the filled-in paper forms, so as to convert the first data items into a computer-readable format, and wherein applying the OCR process comprises using the common validation rule so as to improve a recognition performance of the OCR process.

4. The method according to claim 3, wherein the unified form template comprises graphical features that assist the OCR process, and wherein automatically producing the paper forms comprises printing blank paper forms with the graphical features printed thereon.

5. The method according to claim 3, wherein extracting the first data items from the filled-in paper forms is performed without prior training of the OCR process.

6. The system according to claim 3, wherein the at least one input device is arranged to extract the first data items from the filled-in paper forms using the common validation rule without prior training of the OCR process.

7. The method according to claim 1, wherein validating the first and second data items comprises querying a database with the first and second data items so as to find the first and second data items in a list of valid data items.

8. The method according to claim 1, wherein accepting the filled in e-forms comprises validating the second data items immediately after they are filled in by the second clients.

9. The method according to claim 1, wherein accepting the filled-in paper forms comprises performing at least one action selected from a group of actions consisting of sending the forms by fax, scanning the forms, and sending a scanned image of the forms over a network.

10. The method according to claim 1, wherein accepting the filled-in e-forms comprises performing at least one action selected from a group of actions consisting of sending the forms over a permanent network connection, sending the forms over a temporary network connection, sending the forms by e-mail and physically submitting computer-readable media comprising the forms.

11. The method according to claim 1, wherein the unified form template comprises a visual design defining a graphical appearance of the paper form and the e-form and a physical layout of the data fields in the paper form and the e-form, and wherein the attributes comprise at least one attribute type selected from a group of types consisting of layout related attributes and content-related attributes.

12. A computerized system for processing forms, comprising:
a user interface, which is arranged to interact with a human operator so as to receive a unified form template specifying a joint design of a paper form and an electronic form (e-form), wherein the unified template comprises data fields and respective attributes, of which a common attribute is specified jointly for a given data field in both the paper form and the e-form;
a form processor, which is arranged to automatically produce, based on the unified form template, paper forms to be filled in by hand by first clients of the computerized system and e-forms to be filled in electronically by second clients of the computerized system; and
at least one input device, which is arranged to accept filled-in paper forms, in which first data items have been filled in by hand into the given data field by the first clients, to accept filled-in e-forms, in which second data items have been filled in electronically into the given data field by the second clients, to extract the first and second data items respectively from the filled-in paper forms and the filled-in e-forms, and to validate, using the common attribute, both the first data items that were extracted from the filled-in paper forms and the second data items that were extracted from the filled-in e-forms.

13. The system according to claim 12, wherein the unified form template comprises a common validation rule that defines a validity criterion for the first and second data items filled in into the given data field, and wherein the at least one input device is arranged to validate the first and second data items responsively to the common validation rule.

14. The system according to claim 13, wherein the at least one input device is arranged to apply an optical character recognition (OCR) process to the filled-in paper forms so as to convert the first data items in the filled-in paper forms into a computer readable format, and to use the common validation rule so as to improve a recognition performance of the OCR process.

15. The system according to claim 12, wherein the at least one input device is arranged to query a list of valid data items so as to validate the first and second data items.

16. The system according to claim 12, wherein the unified form template comprises a visual design defining a graphical appearance of the paper form and the e-form and a physical layout of the data fields in the paper form and the e-form, and wherein the attributes comprise at least one attribute type selected from a group of types consisting of layout-related attributes and content-related attributes.

17. A computer software product for processing forms, the product comprising a computer-readable medium, in which program instructions are stored, which instructions, when read by a computer in a computerized system, cause the computer to interact with a human operator so as to receive a unified form template specifying a joint design of a paper form and an electronic form (e-form), wherein the unified template comprises data fields and respective attributes, of which a common attribute is specified jointly for a given data field in both the paper form and the e-form, to automatically produce, based on the unified form template, paper forms to be filled in by hand by first clients of the computerized system and e-forms to be filled in electronically by second clients of the computerized system, to accept filled-in paper forms, in which first data items have been filled in by hand into the given data field by the first clients, to accept filled-in e-forms, in which second data items have been filled in electronically into the given data field by the second clients, to extract the first and second data items respectively from the filled-in paper forms and the filled-in e-forms, and to validate, using the common attribute, both the first data items that were extracted from the filled-in paper forms and the second data items that were extracted from the filled-in e-forms.

* * * * *

UNITED STATES PATENT AND TRADEMARK OFFICE
CERTIFICATE OF CORRECTION

PATENT NO. : 7,607,078 B2  Page 1 of 1
APPLICATION NO. : 11/176503
DATED : October 20, 2009
INVENTOR(S) : Geva et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1140 days.

Signed and Sealed this

Twelfth Day of October, 2010

David J. Kappos
*Director of the United States Patent and Trademark Office*